United States Patent [19]

Baghdasarian

[11] Patent Number: 5,673,459
[45] Date of Patent: Oct. 7, 1997

[54] DEPLOYMENT HINGE APPARATUS

[75] Inventor: Varouj G. Baghdasarian, Cupertino, Calif.

[73] Assignee: Space Systems/Loral, Inc., Palo Alto, Calif.

[21] Appl. No.: 314,068

[22] Filed: Sep. 28, 1994

[51] Int. Cl.$^6$ .............. E05F 1/08; E05D 11/10; B64G 1/22; B64G 1/44
[52] U.S. Cl. .............. 16/308; 16/303; 16/343; 16/325; 16/319; 16/235; 16/285; 16/363; 244/173; 244/158 R
[58] Field of Search .............. 16/308, 303, 343, 16/344, 345, 325, 327, 333, 334, 319, 235, 286, 284, 285, 363; 244/173, 158 R

[56] References Cited

U.S. PATENT DOCUMENTS

| | | | |
|---|---|---|---|
| 3,587,999 | 6/1971 | Miniovitch et al. | 244/1 |
| 4,290,168 | 9/1981 | Binge | 16/175 |
| 4,780,726 | 10/1988 | Archer et al. | 343/881 |
| 4,880,188 | 11/1989 | Roth et al. | 244/173 |
| 5,037,043 | 8/1991 | Roth et al. | 244/173 |

FOREIGN PATENT DOCUMENTS

| | | | |
|---|---|---|---|
| 3215431 | 10/1983 | Germany | 244/173 |
| 3417413 | 1/1986 | Germany . | |
| 1172099 | 7/1989 | Japan | 244/173 |
| 2-11498 | 1/1990 | Japan . | |

Primary Examiner—Maurina T. Rachuba
Assistant Examiner—Adesh Bhargava
Attorney, Agent, or Firm—Perman & Green, LLP

[57] ABSTRACT

Deployment hinge apparatus comprises a stationary U-shaped bracket including a flange defining a retention recess. A hinge arm for supporting an operating structure such as a communication antenna reflector is pivotally mounted on the stationary bracket for movement between a stowed position and a deployed position. The hinge arm includes a deployment and latching cam which extends to a projecting nose member. A latch arm is pivotally mounted at one end to the stationary bracket and includes a cam follower at its other end operatively engageable with the cam. A spring biases the cam follower into engagement with the cam and is thereby effective to rotate the hinge arm from the stowed position to the deployed position such that, in the deployed position, the nose member and the cam follower are together snugly received in the retention recess, locking the hinge arm in the deployed position. In a simplified embodiment, which does not utilize a latch arm or a cam and cam follower, a bearing pivotally mounts the hinge arm on the stationary bracket. A first stop member is provided on the stationary bracket and a second adjustable stop member is provided on the hinge arm positioned to engage the first stop member when the hinge arm is in the deployed position. A spring biases the hinge arm toward the deployed position with the second stop member engaged with the first stop member and is effective to retain the hinge arm in the deployed position.

16 Claims, 11 Drawing Sheets

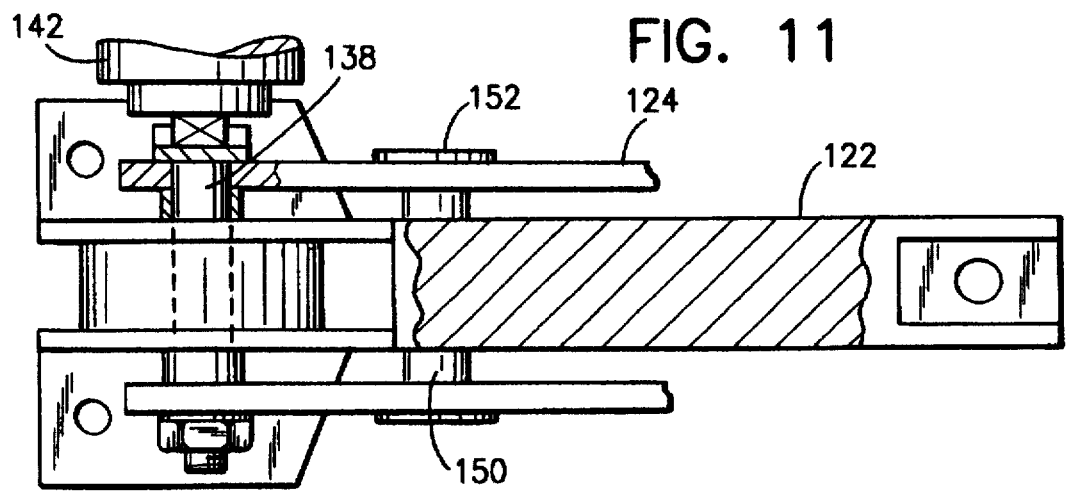
FIG. 11
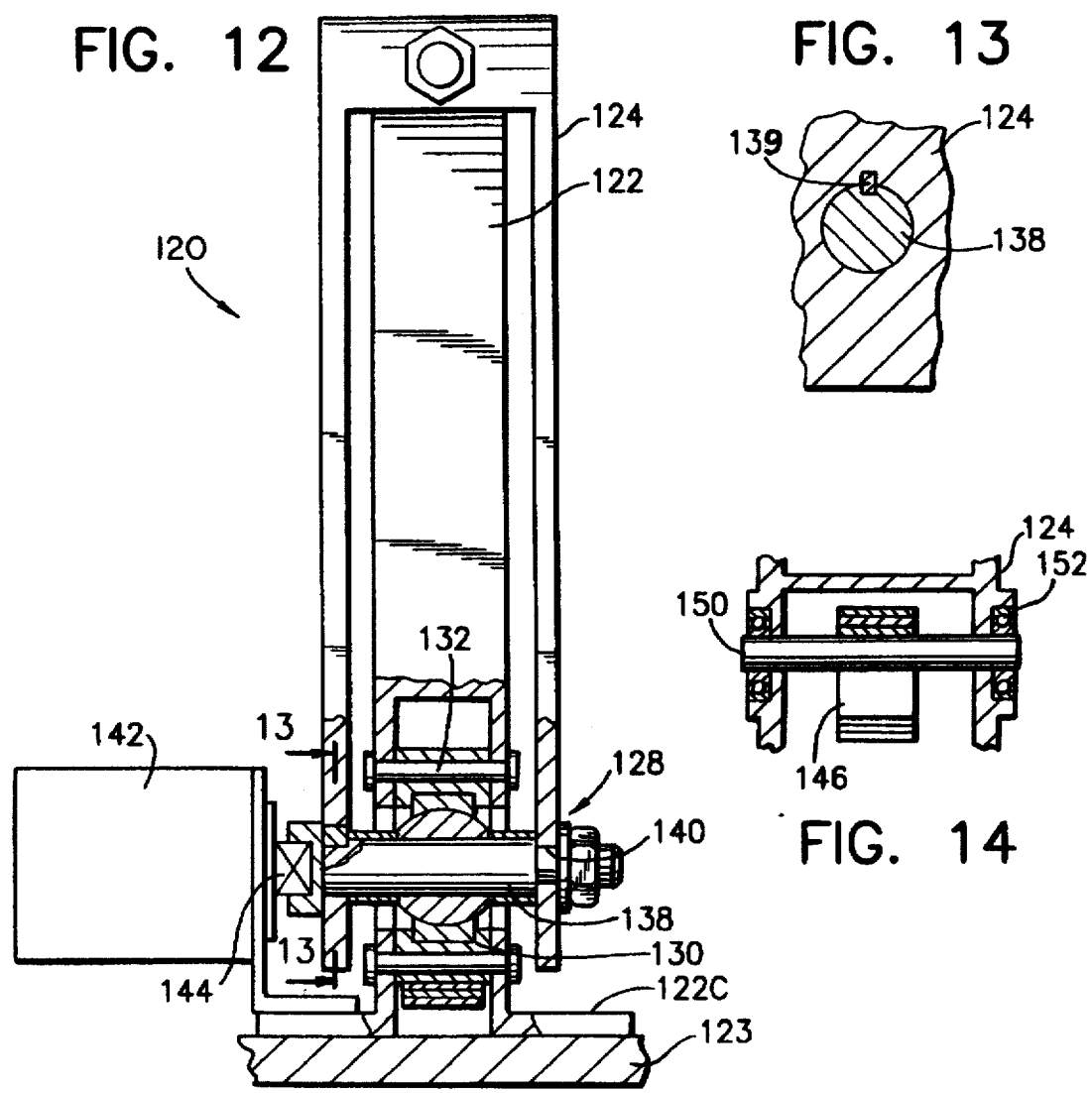
FIG. 12
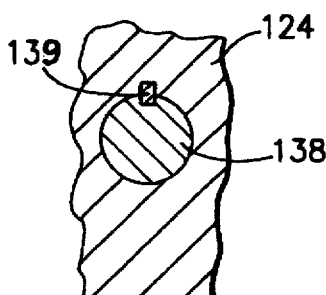
FIG. 13
FIG. 14

DEPLOYMENT HINGE APPARATUS

BACKGROUND OF THE INVENTION

The present invention relates generally to deployable dish-shaped structures of the type designed primarily for use as an antenna or the like in a space environment. More particularly, this invention relates to an improved deployment hinge construction which enables a deployable reflector to be folded rapidly and effortlessly from a highly compact collapsed state to a deployed state.

Collapsible and deployable structures in general are relatively well known and have been widely used in space applications to provide, for example, an antenna or the like for receiving and/or transmitting radio signals. Such collapsible structures advantageously can be stowed compactly in a space vehicle for launching into space and then deployed to the desired expanded configuration.

Generally, such devices are required to perform the following functions:

- an actuating function, since the spacecraft is not always possessed of spinning motion;
- a damping function, to avoid the onset at the end of deployment of excessive stresses in the structure supporting the articulation device;
- a positioning function, called for by the very functions which the deployable structures are required to fulfill; and
- the function of equalizing the rates of opening of the different deployable structures, in order to prevent stability impairing asymmetrical forces from being engendered during rotation of the spacecraft.

The execution of these functions is often closely linked to such strict requirements as: minimum size and weight; the exclusion of nonmetallic materials which may de-gas in space; the exclusion of magnetic materials; extreme accuracy in positioning the deployed appurtenances; and fail-safe operation.

Further, such systems must be capable of ensuring extension of the spacecraft elements under greatly varying conditions such as:

- inertia forces due to a rotating motion that are superimposed upon the actuating function and call upon the damping function to operate over a very wide energy band;
- a wide temperature range;
- a high vacuum; and
- a weightless environment.

It is a principal objective of the present invention to provide a mechanism for satisfying the above-mentioned functions and the requirements for carrying out these functions.

A number of patents disclose various deployment hinge constructions which include a position locking device which is effected when a component such as a solar panel, antenna, reflector, or the like, is fully deployed. In this regard, U.S. Patents to Roth et al., U.S. Pat. Nos. 5,037,043 and 4,880,188 disclose spring biased solar panels having an actuating cam formed with a locking notch to prevent further movement once deployment is achieved. U.S. Pat. No. 4,290,168 to Binge discloses a damper for positively locked spring biased hinges. A variety of constructions of spring biased mechanisms for deploying solar panels and the like are disclosed in U.S. Pat. No. 4,780,726 to Archer et al. and U.S. Pat. No. 3,587,999 to Miniovitch et al.

It was in light of the state of the art as just presented that the present invention was conceived and has now been reduced to practice.

SUMMARY OF THE INVENTION

According to the present invention deployment hinge apparatus comprises a stationary U-shaped bracket including a flange defining a retention recess. A hinge arm for supporting an operating structure such as a communication antenna reflector is pivotally mounted on the stationary bracket for movement between a stowed position and a deployed position. The hinge arm includes a deployment and latching cam which extends to a projecting nose member. A latch arm is pivotally mounted at one end to the stationary bracket and includes a cam follower at its other end operatively engageable with the cam. A spring biases the cam follower into engagement with the cam and is thereby effective to rotate the hinge arm from the stowed position to the deployed position such that, in the deployed position, the nose member and the cam follower are together snugly received in the retention recess, locking the hinge arm in the deployed position.

In a simplified embodiment, which does not utilize a latch arm or a cam and cam follower, a bearing pivotally mounts the hinge arm on the stationary bracket. A first stop member is provided on the stationary bracket and a second adjustable stop member is provided on the hinge arm positioned to engage the first stop member when the hinge arm is in the deployed position. A spring biases the hinge arm toward the deployed position with the second stop member engaged with the first stop member and is effective to retain the hinge arm in the deployed position.

The purpose of the present invention is to simplify the existing complex and costly deployment hinges used on most satellites to deploy communication antenna reflectors. The existing hinge constructions contain many complex parts, springs, and other components which require many hours of assembly and subsequent adjustments. In many instances, the operation of existing hinge constructions requires a set of springs to deploy the hinge arm, and another set of springs to force the latch roller into the cam slot at the end of the deployment operation. The stiffness and amount of backlash of existing hinges depends on the stiffness of the latch arm and the clearances of its components from end to end, which can never be zero.

The hinge of the invention comprises a fixed hollow bracket mounted to a hinge mounting panel at three locations, two being fixed at the front end and one being adjustable at the back end. A hinge arm supporting the deployable appendage, in this case an antenna reflector, is pivotally mounted inside the bracket. A U-shaped latch arm with a roller follower at its free end is pivotally mounted to the fixed bracket at its opposite restrained end. As the latch arm is rotated about its pivot on the fixed bracket by a pair of springs operating in concert, the roller follower rolling on the cam surface forces the cam and, consequently, the hinge arm, to rotate from a stowed position to a deployed position, against a stop. A terminal end of the cam is shaped such that it forms a tapered retention recess in conjunction with its counter part on the fixed bracket. At the end of the deployment movement, the roller follower is wedged by the springs into this recess and operates to lock the hinge arm in the deployed position.

Orientation of the retention recess is such that backward motion of the hinge arm will not drive the roller follower backwards. As a result the hinge arm will not unlatch from its latched position.

There are numerous advantages of the new hinge over existing hinge constructions. In a first instance, many fewer parts are required for its fabrication, resulting in large cost savings over existing designs. Another significant feature of the invention resides in the fact that the same spring, or pair of springs, is used to deploy the hinge arm and to latch the roller follower. Additionally, very accurate and repeatable deployment can be achieved by reason of the novel construction, because neither the cam nor the roller follower, nor their dimensions or tolerances have any influence on the end deployment angle. Only the hard stop designed into the system of the invention determines the angle. Additional features include the elimination of backlash, a much lighter and stiffer structure than the existing design, and the ability of the present invention to be manufactured from composite materials. Yet another feature of the invention resides in the fact that the shape of the deployment cam may be tailored to produce a specific deployment torque over a specific range of the deployment angle.

Other and further features, advantages, and benefits of the invention will become apparent in the following description taken in conjunction with the following drawings. It is to be understood that the foregoing general description and the following detailed description are exemplary and explanatory but are not to be restrictive of the invention.

The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 11 is a top plan view, partly cut away and shown in section for clarity, of the modified deployment hinge apparatus illustrated in FIG. 10;

FIG. 12 is a side elevation view, partly cut away and shown in section for clarity, of the modified deployment hinge apparatus illustrated in FIGS. 10 and 11;

FIG. 13 is a cross section view taken generally along line 13—13 in FIG. 12;

FIG. 14 is a detail cross section view taken generally along line 14—14 in FIG. 10;

DESCRIPTION OF THE PREFERRED EMBODIMENT

Turn now to the drawings and, initially, to FIGS. 1, 2, 3A, 3B, 4A, and 4B which illustrate a known construction of deployment hinge apparatus as generally indicated at 20. It is important to know and understand the construction of the prior art in order to appreciate fully the technological advance provided by the present invention.

Figure 1:
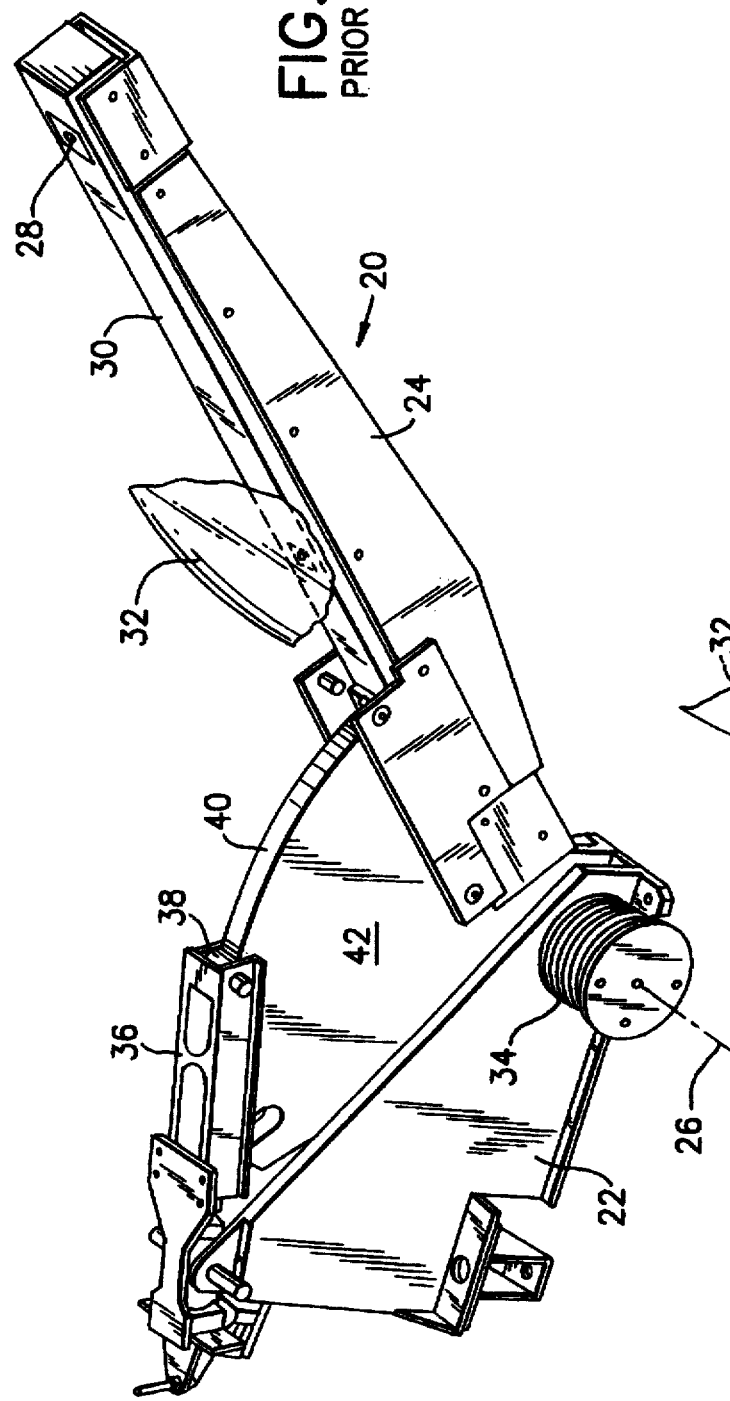
FIG. 1 is a perspective view of deployment hinge apparatus embodying the prior art.
Figure 2:
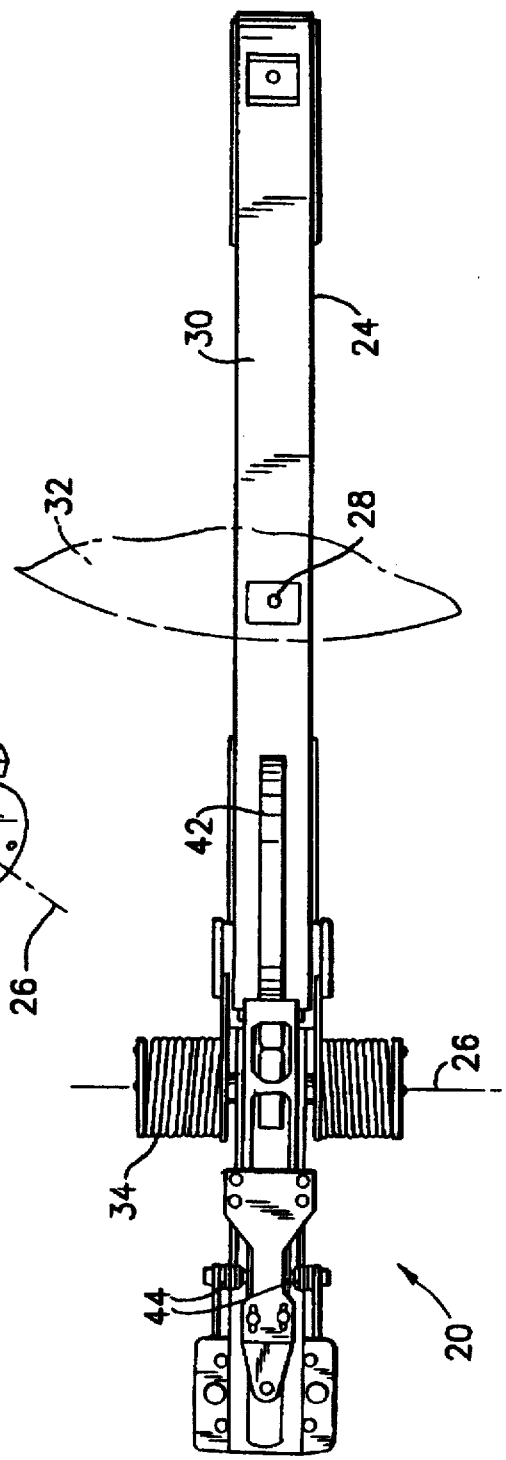
FIG. 2 is a top plan view of the prior art apparatus illustrated in FIG. 1.
Figure 3A:
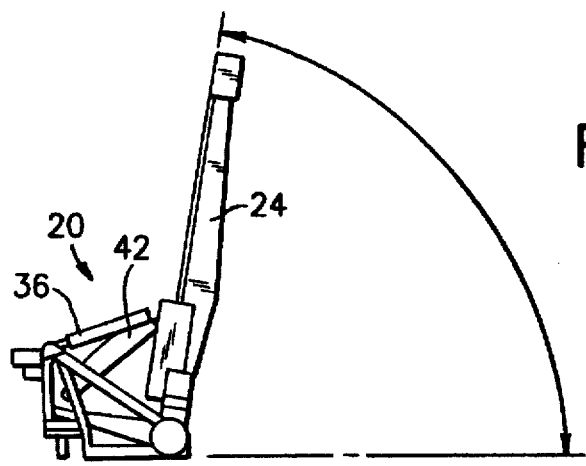
FIG. 3A is a side elevation view illustrating the prior art apparatus of FIGS. 1 and 2 in the stowed position.
Figure 4A:
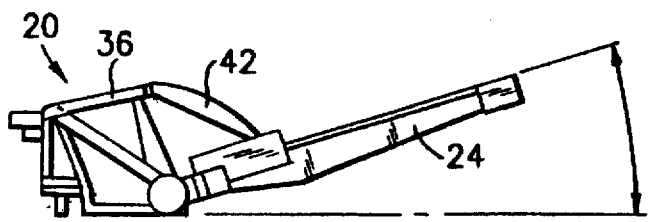
FIG. 4A is a side elevation view illustrating the prior art apparatus of FIGS. 1 and 2 in the deployed position.

Briefly, the deployment hinge apparatus 20 includes a stationary U-shaped (in cross section) bracket member 22 which is suitably fixedly mounted on the body of a space craft or satellite (not here shown). A pair of spaced apart hinge arms 24 (only one is illustrated) are pivotly mounted on a pair of bracket members 22 (only one is illustrated) for movement about a transverse axis 26 (FIGS. 1 and 2) between a stowed configuration as depicted in FIG. 3A and a deployed configuration as depicted in FIG. 4A. Throughout the disclosure, reference to one hinge arm 24 and associated basket member 22 will be taken to apply to their associated hinge arm and bracket member as well. Mounting holes 28 are provided in an upper surface 30 of the hinge arm for attaching an operating structure 32 such as a communication antenna reflector. A pair of torsional springs 34 are mounted on opposite side of the bracket member 22. One end of each spring is embedded in the structure of the bracket member while the opposite end is suitably engaged with the hinge arm 24. The springs 34 operate in concert to rapidly move the hinge arm 24 from the stowed (FIG. 3A) position to the deployed (FIG. 4A) position.

A latch arm 36 is pivotly mounted on the bracket member 22 at a location distant from the transverse axis 26. At an extremity of the latch arm 36, a roller follower 38 is engaged with a contoured surface 40 of a cam 42 which is integrally mounted on the hinge arm 24. The roller follower 38 is biased into engagement with the contoured surface 40 by means of a pair of springs 44 (FIG. 2).

Figure 3B:
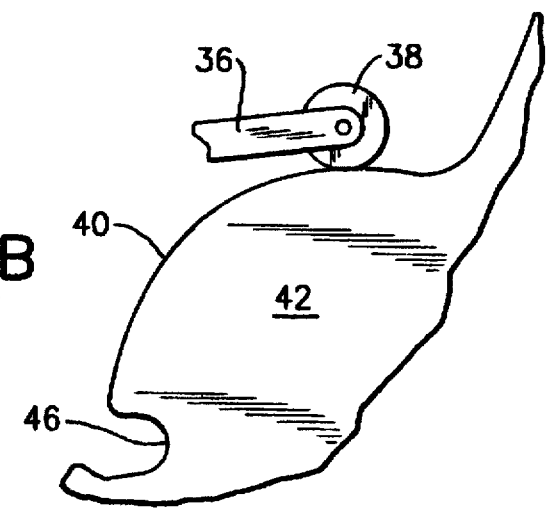
FIG. 3B is a diagrammatic detail side elevation view depicting the relative positions of latching components when they assume the stowed (FIG. 3A) position.
Figure 4B:
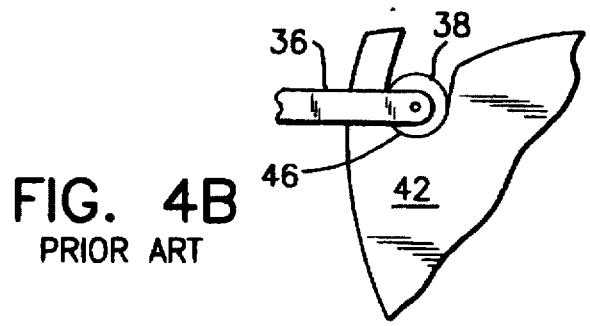
FIG. 4B is a diagrammatic detail side elevation view depicting the relative positions of latching components when they assume the deployed (FIG. 4A) position.

As the hinge arm 24 is advanced under the bias of the torsional springs 34 from the stowed (FIGS. 3A and 3B) position to the deployed (FIGS. 4A and 4B) position, the roller follower 38 advances along the contoured surface as depicted in FIG. 3B to an extreme position, as depicted in FIG. 4B. At the FIG. 4B position, the roller follower 38 is received in a locking recess 46 which defines the deployed position of the hinge arm and prevents further movement of the hinge arm relative to the bracket member 22.

While the deployment hinge apparatus 20 served its intended purpose well, it was in attempt to improve upon that construction that the present invention has been developed.

Figure 5A:
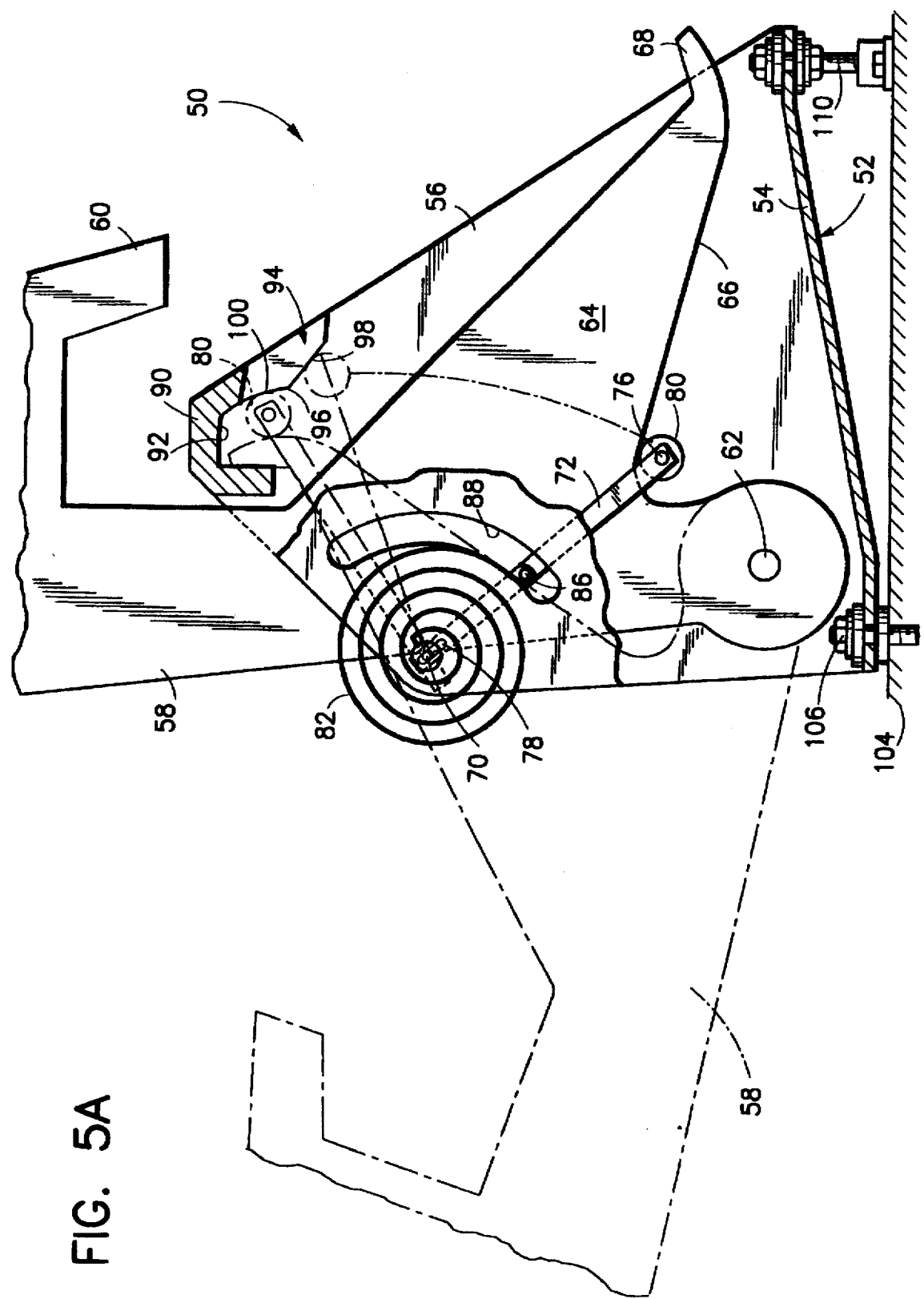
FIG. 5A is a side elevation view, certain parts being cut away and shown in section for clarity, depicting deployment hinge apparatus embodying the present invention.
Figure 5B:
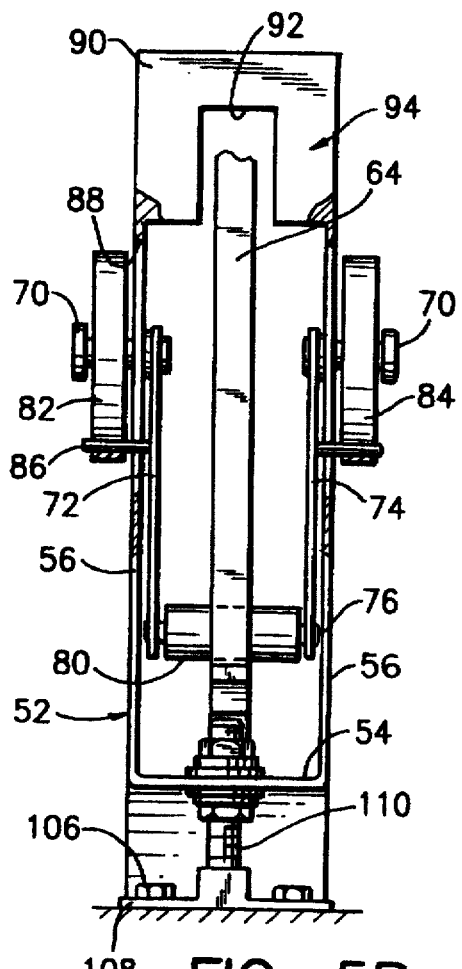
FIG. 5B is an end elevation view of the deployment hinge apparatus illustrated in FIG. 5A.

For a description of one embodiment of the present invention, turn now initially to FIGS. 5A and 5B. As seen therein, self-latching deployment hinge apparatus 50 includes a stationary U-shaped bracket member 52 which is defined by a base 54 and a pair of upstanding parallel sidewalls 56 which are integral with the base. A pair of parallel spaced hinge arms 58 for supporting an operating structure 60 which may be, for example, a communication antenna reflector, is pivotly mounted on a hinge bearing 62 for pivotal movement on the bracket 52 between a stowed position as depicted by solid lines and a deployed position as depicted by dot-dash lines.

Integral with each hinge arm 58 is a deployment and latching cam 64 which has a contoured surface 66 which extends to a nose member 68 which projects from an extremity of the cam.

A pair of axially aligned pins 70 (FIG. 5B) are fixed, respectively, to the opposed sidewalls 56 and project both inwardly and outwardly from the sidewalls. A pair of latch arms 72, 74 extend from the pins 70 to opposite ends which are joined by a cross bar 76. The latch arms 72, 74 are mutually parallel and each is formed with a slot 78 at its proximal end for slidable reception on the pins 70. A cam roller follower 80 is journaled on the cross bar 76 so as to be freely rotatable therein.

A pair of resilient biasing members are provided for rapidly moving the hinge arm 24 from the stowed to the deployed position. These resilient biasing members are illustrated as being torsion springs 82, 84 externally mounted on opposite sides of the sidewalls 56. While torsion springs are disclosed, it will be appreciated that other forms of resilient biasing means may also be appropriate for the task to be performed.

In this instance, the inner end of each of the springs 82, 84 is fixed to its associated pin 70 and an outer end is suitably attached to a drive pin 86 which is integral with each of the latch arms 72, 74 and projects outwardly through an arcuate slot 88 suitably located in each associated sidewalls 56.

At a location distant from its base 54, the bracket 52 includes a flange 90 which extends across and is integral with the sidewalls 56. The flange 90 is shaped to define a retention recess 92 which generally faces the base 54 of the bracket member 52.

Also provided on the bracket member 52 is a roller guide cam 94 which is coplanar with the cam roller follower 80 but is out-of-plane with respect to the deployment and latching cam 64. This relationship can be most clearly seen in FIG. 5B. Viewing FIG. 5A, the roller guide cam 94 is formed with a peak 96 and adjacent ascending and descending slopes, 98, 100, respectively, all being in the path of the cam roller follower 80. The descending slope 100 is immediately in communication with the retention recess 92.

The operation of the apparatus 50, just described, will now be explained. As previously mentioned, to deploy the hinge from its stowed position, the torsion springs 82, 84 mounted on the bracket member 52 serve to rotate the hinge arm 58 and its associated deployment and latching cam 64 about the hinge bearing 62 in a counterclockwise direction, viewing FIG. 5A. The cam roller follower 80 engaged with the contoured surface 66 of the cam 64, under the bias of the springs 82, 84, forces the rotation of the cam and hinge arm 58 upon the release of a suitable retention device which forms no part of the present invention.

Figure 6:
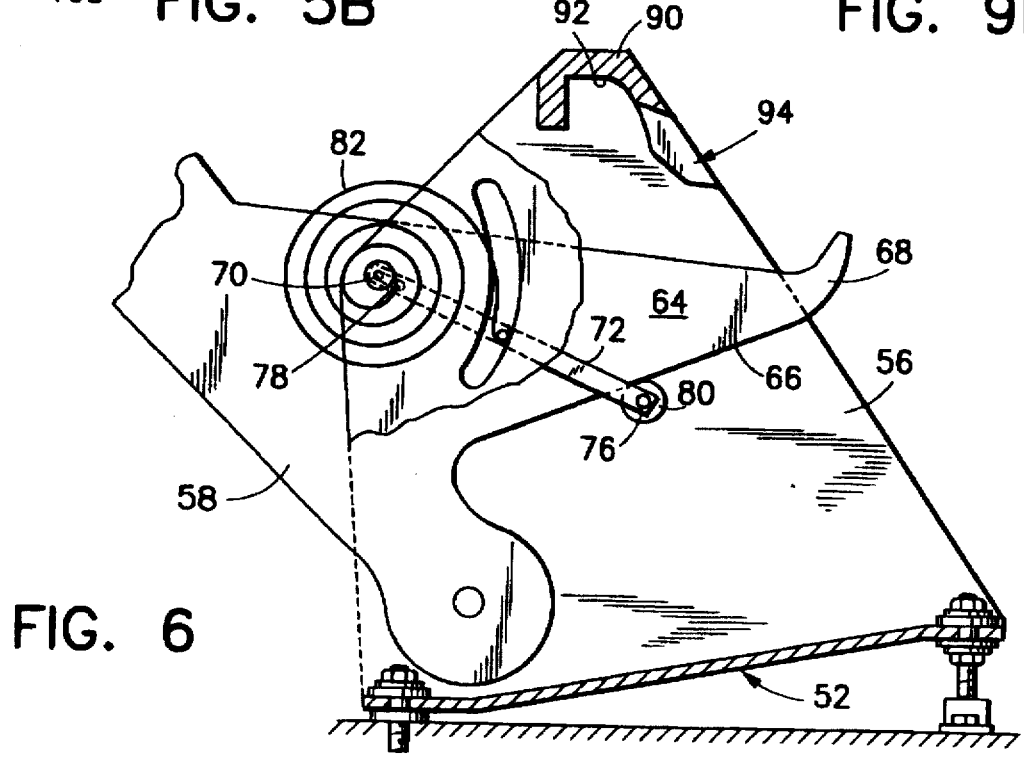
FIGS. 6, 7, and 8 are detail side elevation views, similar to FIG. 5A, illustrating intermediate positions of the deployment hinge apparatus.
Figure 7:
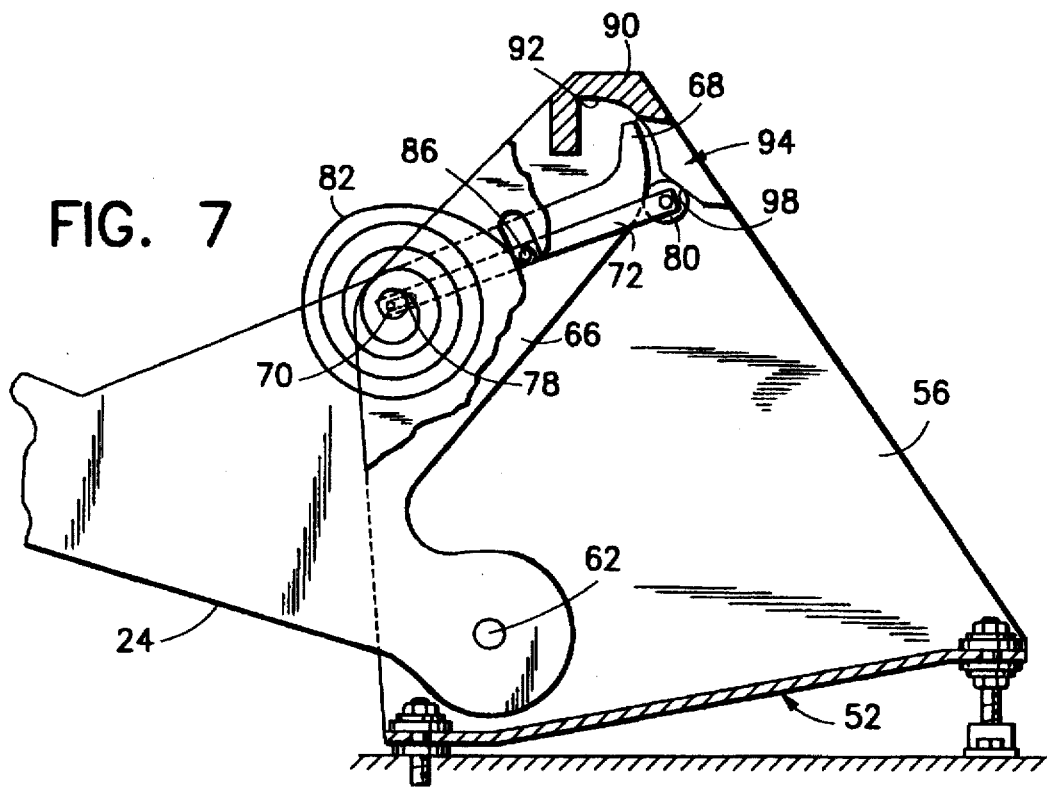

FIG. 6 illustrates a partially deployed orientation of the hinge arm 58 and cam 64. With continued movement in the counterclockwise direction, as illustrated in FIG. 7, the nose member 68 proceeds into the retention recess 92 as the roller follower 80 moves into engagement with the ascending slope 98 of the roller guide cam 94.

Figure 8:
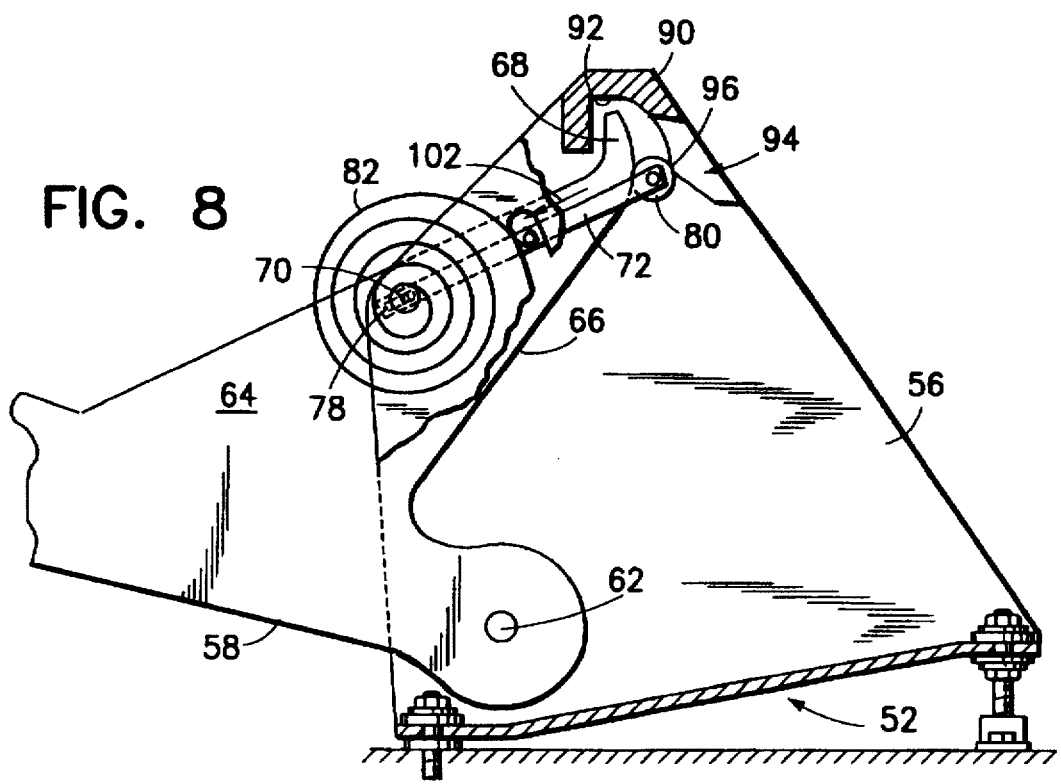

Continued rotation of the hinge arm 58 and the cam 64 cause the roller 80 to continue to ascend the slope 98 to the point at which, seen in FIG. 8, the roller is in engagement with the peak 96. In order for this to occur, it is necessary that the latch arms 72, 74 move to the left in the direction of an arrow 102. The slot 78 accommodates such movement which occurs against the bias of the spring 82 for the latch arm 72 and against the bias of the spring 84 for the latch arm 74.

Figure 9B:
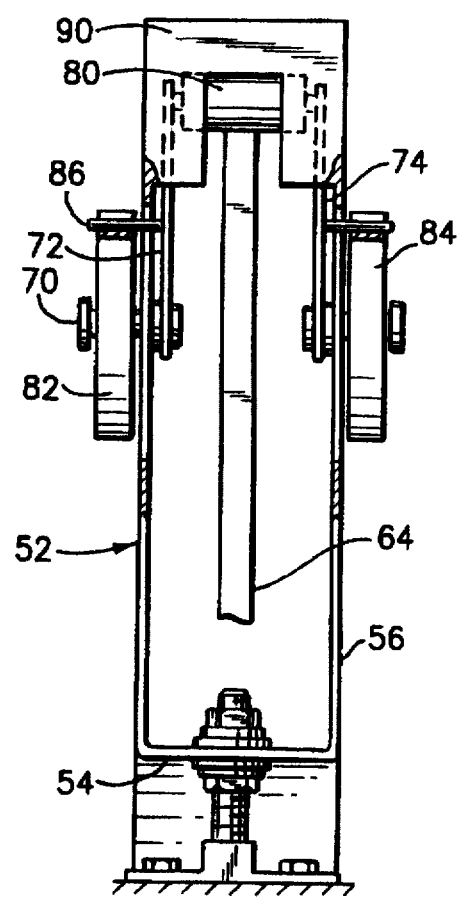
FIG. 9B is an end elevation view, similar to FIG. 5B, but depicting the relative positions of the components of the deployment hinge apparatus as illustrated in FIG. 9A.
Figure 9A:
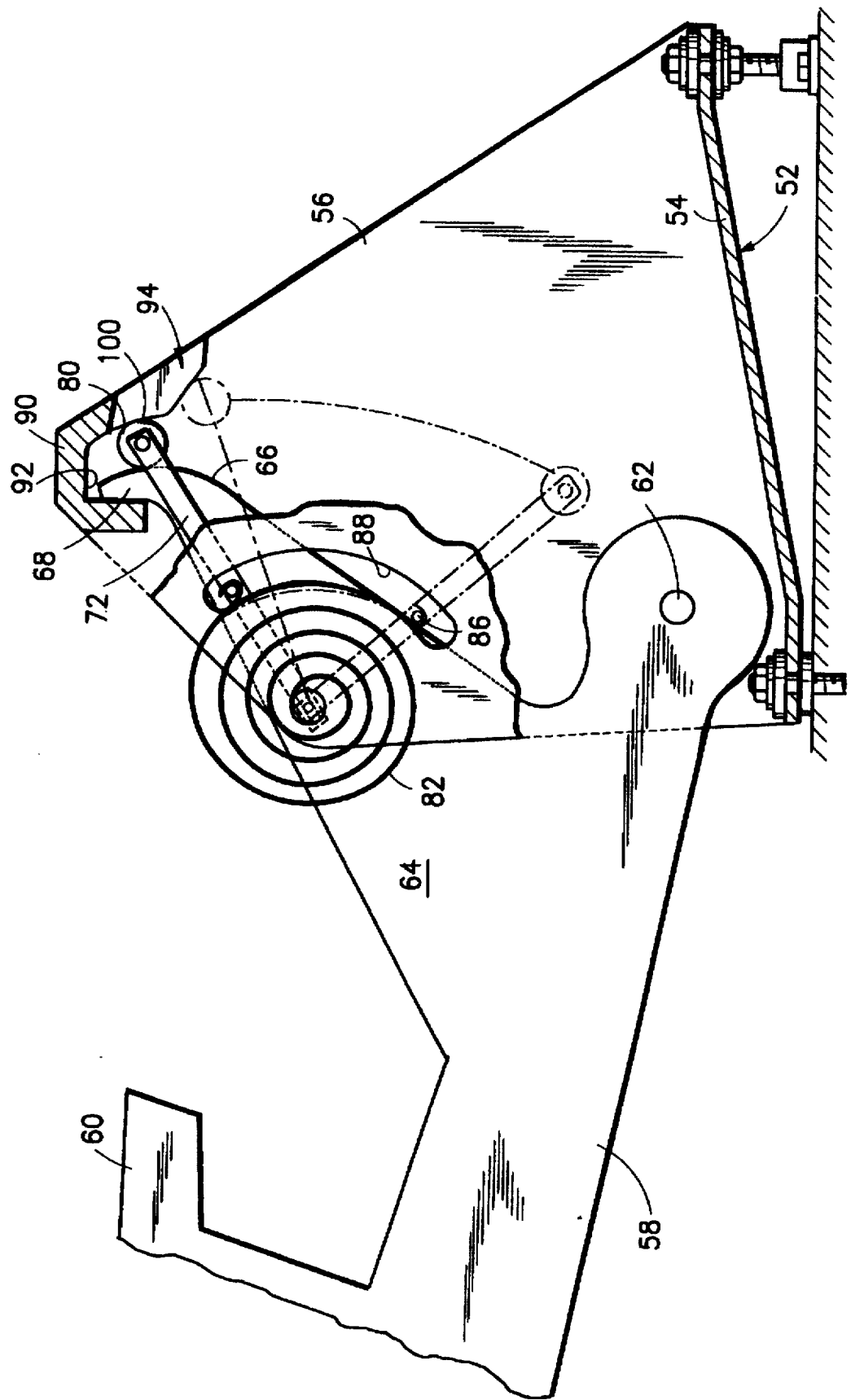
FIG. 9A is a side elevation view, similar to FIG. 5A, illustrating the fully deployed position of the deployment hinge apparatus of the invention.

With continued rotation of the hinge arm 58 and of the cam 64, the position illustrated in FIGS. 9A and 9B is reached at which the cam roller follower 80 is wedged in the retention recess 92 between the nose member 68 and the descending slope 100 of the roller guide cam 94. The orientation of the slot defined by the nose member 68 and descending slope 100 is designed to assure that reverse motion of the hinge arm 58 is ineffective to release it from its latched position. Indeed, only by manually reversing the travel of the latch arms 72, 74 until the relative position of components as illustrated in FIG. 7 is reached, can unlatching be achieved.

Provision may be made for selectively adjusting the orientation of the operating structure 60 when the hinge arm 58 assumes the deployed position. As seen in FIGS. 5A and 5B, the bracket member 52 is secured to a mounting panel 104 of a spacecraft or satellite. This may be achieved, for example, by means of a pair of fixed mounts defined by a pair of fasteners 106 and associated mounting flanges 108 integral with the bracket member 52. At its other end, the base 54 of the bracket member 52 may be attached to the mounting panel 104 by means of an adjustable stud 110. By adjusting the length of the stud 110, the orientation of the operating structure 60 can be finely adjusted about an axis generally parallel that of the hinge bearing 62.

Another, and more simplified, embodiment of the present invention will now be disclosed with reference to FIGS. 10 to 20. Such simplified deployment hinge apparatus generally indicated by the reference numeral 120 includes a stationary bracket member 122 (FIG. 17) which may be fabricated from any suitable material although a particularly desirable construction would use graphite epoxy faceskins 122A with an aluminum honeycomb core 122B.

A hinge arm 124 (FIG. 18) serves to support an operating structure 126 which, as in the previous embodiment, may be a communication antenna reflector. The hinge arm 124, which may be fabricated from graphite epoxy composite material or from any other suitable material, is pivotly mounted on the stationary bracket member 122 by means of a suitable bearing 128 (see especially FIGS. 12 and 16) including a housing 130 mounted by means of fasteners 132 to the bracket member 122. The bearing 128 also includes a self-aligning spherical member 134 having a central bore 136 therethrough whose axis is generally transverse to a plane of the bracket member 122. A removable hinge pin 138 is slidably received within the central bore 136 and extends a sufficient distance laterally from both sides of the stationary bracket member 122 so as to pivotly receive thereon mounting holes 140 at a near end of the hinge arm 124. The hinge pin 138 is suitably fixed, as by key 139 (FIG. 13), to the hinge arm 124 so that the two components move in unison.

As seen in FIG. 12, a rotary damper 142 may be operably mounted to an end of the hinge pin 138 to slow down the deployment rate of the hinge arm 124 on the bracket member 122 and to prevent high deployment loads from occurring between those components. A flex coupling 144 is desirable to assure that the self aligning capability of the bearing 128 will not be compromised. That self aligning capability assures that potential misalignment of a pair of hinges due to mounting to the operating structure will not cause the shaft 138 to bind.

Stationary bracket member 122 may be mounted to a space craft or satellite 123 by means of fixed mounting flanges 122A and suitable fasteners (not shown). Adjustment of the bracket member relative to the space craft or satellite 123 may be achieved in the manner of the earlier described embodiment or by some other suitable alternative construction.

Figure 10:
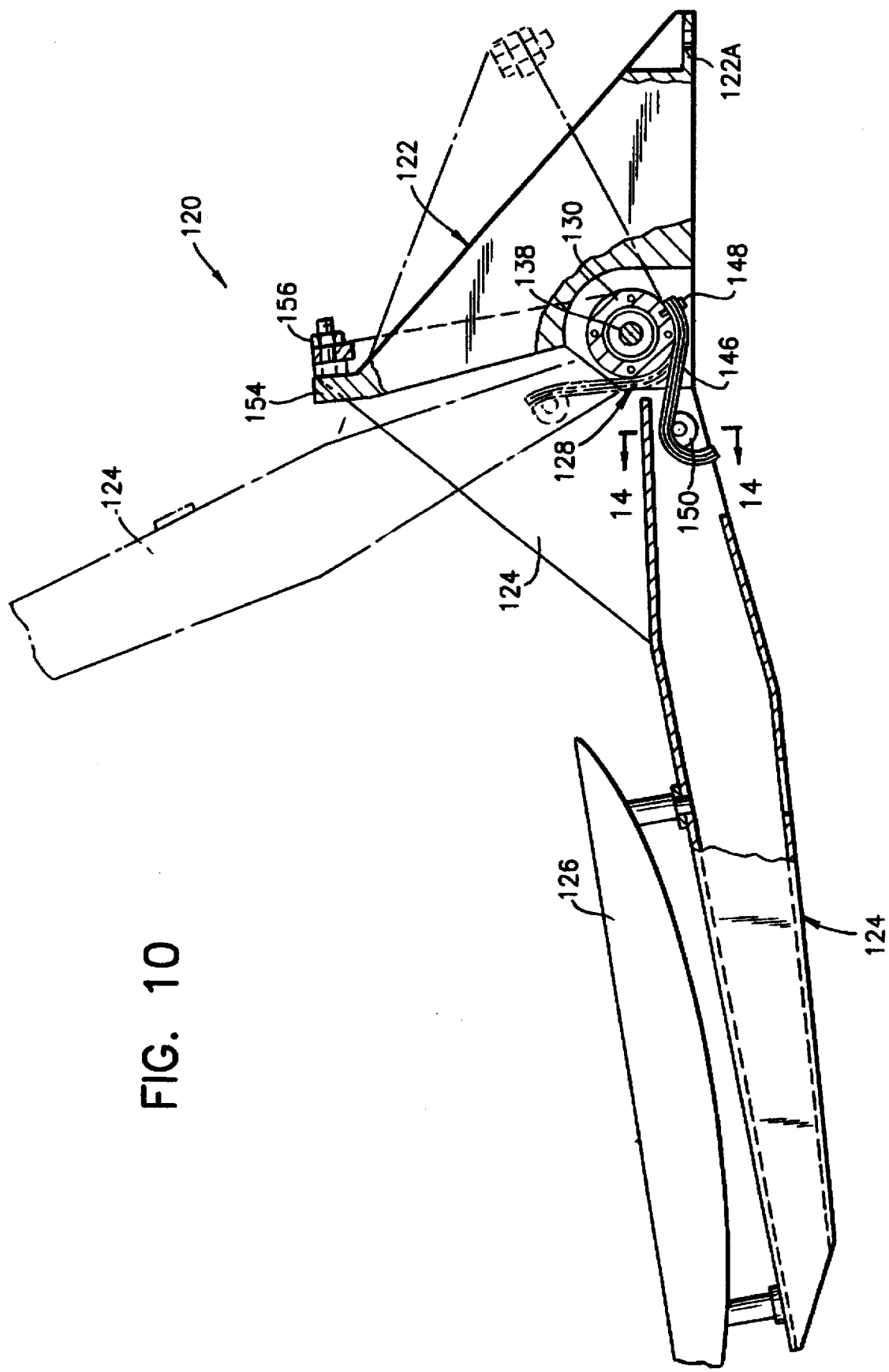
FIG. 10 is a side elevation view, partly cut away and shown in section for clarity, illustrating another embodiment of the invention.
Figure 15:
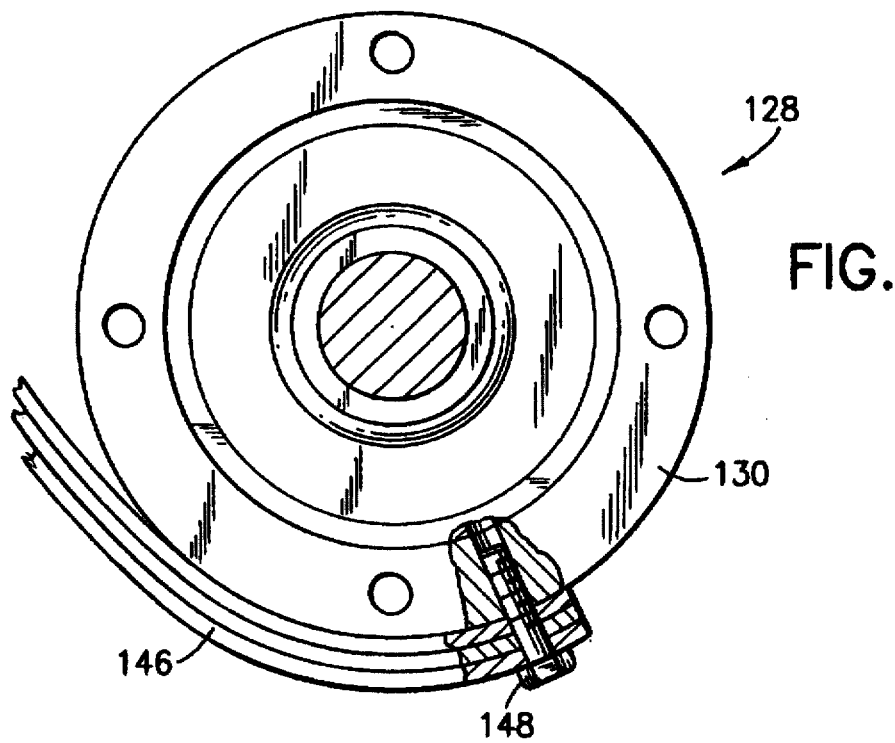
FIG. 15 is a detail side elevation view, partly cut away and shown in section for clarity, to illustrate in greater detail certain components shown in FIG. 10.
Figure 16:
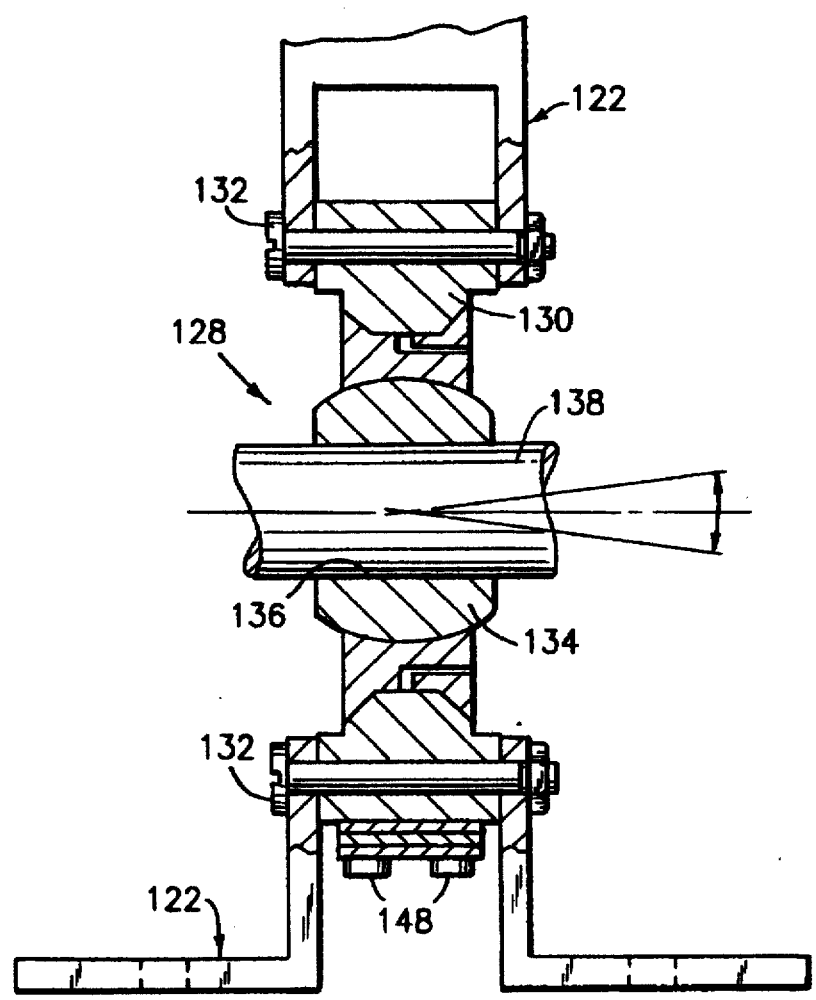
FIG. 16. is a detail end elevation view, partly cut away and shown in section for clarity, to illustrate in greater detail certain components shown in FIG. 12.
Figure 17:
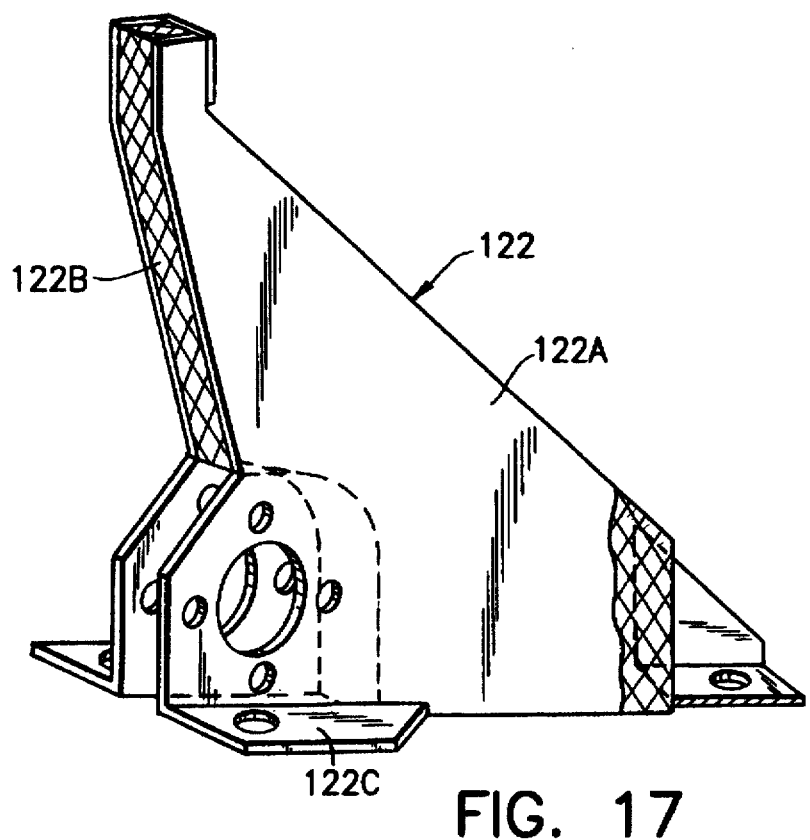
FIG. 17 is a perspective view of one component of the modified deployment hinge apparatus of the invention.
Figure 18:
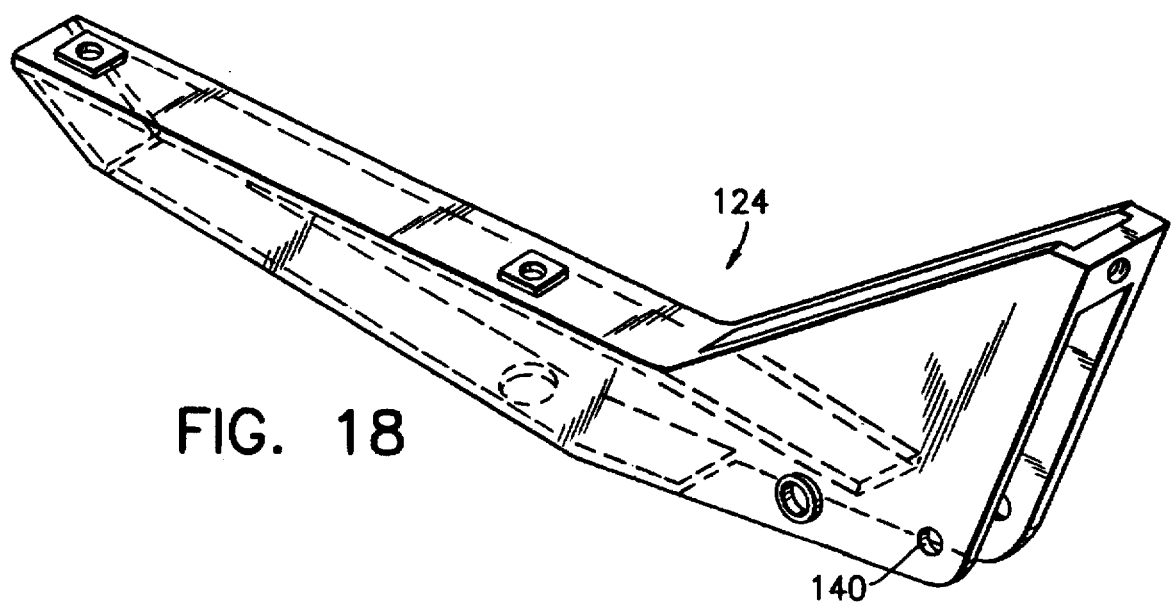
FIG. 18 is a perspective view of another component of the modified deployment hinge apparatus of the invention.

A resilient member serves to bias the hinge arm 124 toward the deployed position illustrated by solid lines in FIG. 10 from the stowed position illustrated by dash-dot lines. Specifically, a leaf spring 146 comprised of one or more leafs is secured at one end to the bearing housing 130 by means of suitable bolts 148 (see especially FIG. 15). Spaced from its attachment location, the leaf spring 146 is engaged by a roller 150 which is rotatably supported by opposed bearings 152 mounted on sidewalls of the hinge arm 124.

At a location distant from mounting flanges 122C, the stationary bracket member 122 is formed with a first stop member 154 which is aligned with a second stop member 156 on the hinge arm 124 distant from the bearing 128. The stop member 156 is aligned to engage the first stop member 154 when the hinge arm 124 is in the fully deployed position.

Once a suitable retention device forming no part of the present is actuated, the hinge arm 124 is free to rotate on the bearing 128 with the leaf spring 146 providing the necessary energy to pivot the hinge 124 from the stowed to the deployed position. With movement of the hinge arm 124, the roller 150 in engagement with the leaf spring 146 is caused to roll along the surface of the leaf spring minimizing friction and, therefore, wear between those components. In effect, as the hinge arm 124 moves from its stowed to its deployed position, the roller 150 is caused to move relative to the leaf spring 146, from an end thereof to a location mid way between the ends thereof.

Figure 19:
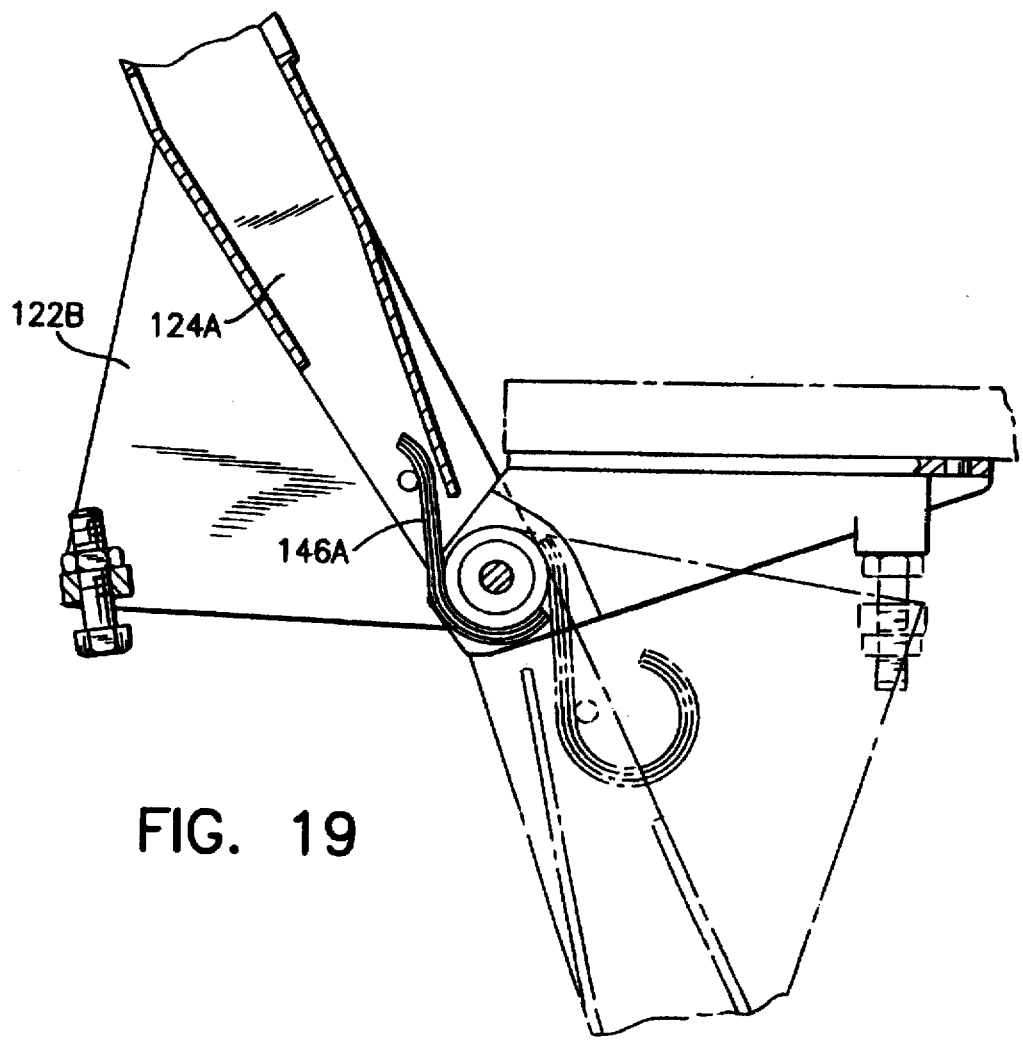
FIG. 19 is a detail side elevation view, similar to FIG. 10, illustrating the extreme movement capability of the modified deployment hinge apparatus of the invention.

The leaf spring 146 is a preferred energy expedient for driving the hinge arm 124 between the stowed and deployed positions. In a modified design as illustrated in FIG. 19, a leaf spring 146A is capable of moving a hinge arm 124A through a deployment angle of approximately 180° relative to a stationary bracket member 122B. An initial position is depicted by solid lines, a final position by dash-dot lines.

Figure 20:
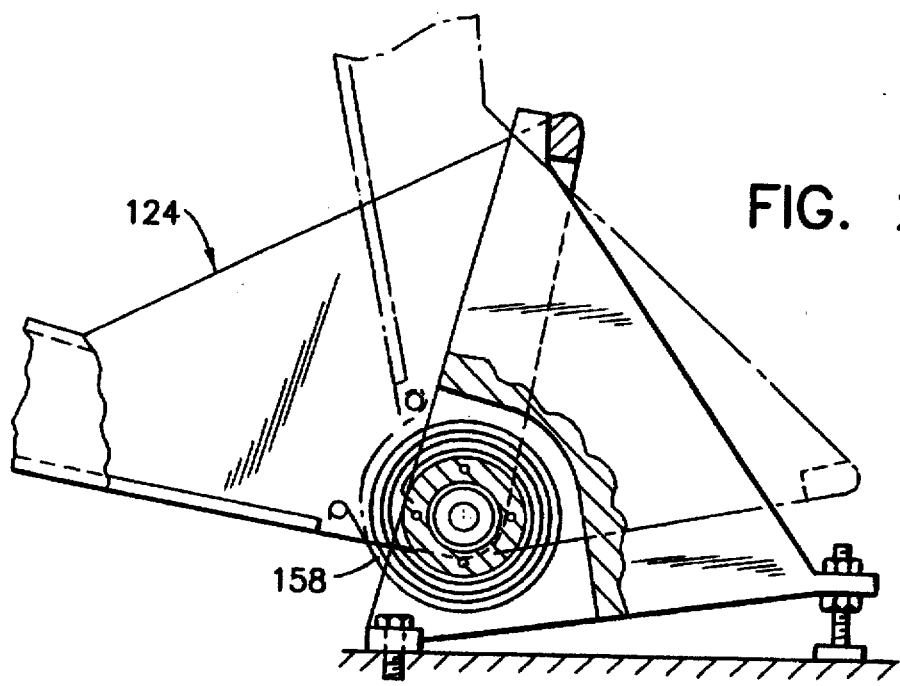
FIG. 20 is a side elevation view, similar to FIG. 10, illustrating still another embodiment of the invention.

It will be appreciated that other resilient members may be used to bias the hinge arm. Thus, for example, as seen in FIG. 20, a torsion spring 158 may be employed for this purpose.

The manner of mounting the deployment hinge apparatus 120 to the spacecraft or satellite 123 may be adjustable in the manner of the preceding embodiment, as noted above.

Another expedient for selectively adjusting the orientation of the operating structure 126 when the hinge arm 124 assumes the deployed position is illustrated in FIG. 10. Specifically, the second stop member 156 may be a bolt whose head 160 is adjustable in a suitable manner, as by screwing, to thereby effect a desired change of orientation of the finally deployed position of the operating structure 126 about the axis defined by the hinge pin 138.

Benefits achieved by the deployment hinge apparatus 120 include its simplicity and low cost as well as its versatility by reason of its broad range of deployment angles which are achievable with its use. It has a high deployment torque margin with low deployment loads due to use of a damper. High stiffness and light weight are achievable by use of composite materials and the apparatus experiences no backlash after its deployment.

While preferred embodiments of the invention have been disclosed in detail, it should be understood by those skilled in the art that various other modifications may be made to the illustrated embodiments without departing from the scope of the invention as described in the specification and defined in the appended claims.

What is claimed is:

1. Self-latching deployment hinge apparatus comprising:

stationary bracket means including a flange defining a retention recess;

hinge arm means supporting an operating structure and pivotally mounted on said stationary bracket means for moving the operating structure between a stowed position and a deployed position, said hinge arm means including a deployment and latching cam thereon extending to a nose member projecting from an extremity thereof;

latch arm means pivotally mounted at one end to said stationary bracket means and including cam follower means at the other end thereof operatively engageable with said deployment and latching cam; and resilient means biasing said cam follower means into engagement with said deployment and latching cam and for rotating said hinge arm means from said stowed position to said deployed position such that, in said deployed position, said nose member and said cam follower means are together snugly received in the retention recess, locking said hinge arm means in said deployed position.

2. Self-latching deployment hinge apparatus as set forth in claim 1 wherein said stationary bracket means includes:
a base; and
a pair of upstanding parallel sidewalls integral with said base;

wherein said latch arm means is U-shaped and includes:
first and second latch arms, each extending between an inboard end and an outboard end;
a cross bar integral with said outboard ends and having said cam follower means thereon, said cross bar being coplanar with said hinge arm means; and
axle means pivotally mounting said inboard ends of said first and second latch arms, respectively, to an associated one of said upstanding sidewalls; and wherein said resilient means includes:
a torsion spring fixed at its inboard end to each of said upstanding sidewalls and at its outboard end to each of said first and second latch arms intermediate said inboard end and said outboard end.

3. Self-latching deployment hinge apparatus as set forth in claim 2 wherein said cam follower means includes a roller follower rotatably mounted on said cross bar.

4. Self-latching deployment hinge apparatus as set forth in claim 1 including:

means for mounting said stationary bracket means on a mounting panel;

adjustment means for selectively adjusting the orientation of the operating structure when said hinge arm means assumes said deployed position.

5. Self-latching deployment hinge apparatus as set forth in claim 1 wherein said stationary bracket means includes a guide cam adjacent the retention recess, said guide cam having a peak and adjacent ascending and descending slopes, all being in the path of said cam follower means, said descending slope being immediately in communication with the retention recess;

wherein each of said first and second latch arms has a longitudinally extending elongated slot adjacent said inboard end for reception therethrough of said axle means, said torsion spring biasing said axle means into engagement with the inboard end of the elongated slot;

whereby, with movement of said hinge arm means toward said deployed position, said cam follower means moves into engagement with said guide cam, initially with said ascending slope, then with said peak which moves said first and second latch arms against the bias of said torsion springs toward said inboard ends, then with said descending slope and into the retention recess, said cam follower means simultaneously causing said nose member to also move into the retention recess.

6. Self-latching deployment hinge apparatus as set forth in claim 1 wherein said hinge arm means has a longitudinal axis;

wherein said latch arm means includes at least one latch arm extending between an inboard end and an outboard end; and wherein, with said hinge arm means being in said deployed position and said nose member of said hinge arm means and said cam follower means being receivably engaged with the retention recess, said latch arm lies in a plane which is transverse of said longitudinal axis of said hinge arm means such that force applied only to said hinge arm means is ineffective to release said hinge arm means from said deployed position.

7. Self-latching deployment hinge apparatus as set forth in claim 1 wherein the operating structure supported on said hinge arm means is a communication antenna reflector.

8. Self-latching hinge apparatus as set forth in claim 1 wherein the operating structure supported on said hinge arm means is a communication antenna reflector.

9. Self-latching hinge apparatus as set forth in claim 1 wherein said first stop means is fixed on said stationary bracket means; and wherein said second stop means is adjustable for selectively adjusting the orientation of the operating structure when said hinge arm means assumes said deployed position.

10. Self-latching deployment hinge apparatus comprising:

stationary bracket means;

hinge arm means supporting an operating structure and pivotally mounted on said stationary bracket means for moving the operating structure between a stowed position and a deployed position;

bearing means pivotally mounting said hinge arm means on said stationary bracket means;

first stop means on said stationary bracket means;

second stop means on said hinge arm means positioned to engage said first stop means when said hinge arm means is in said deployed position; and sole resilient means biasing said hinge arm means toward said deployed position and for biasing said second stop means into engagement with said first stop means and effective thereby to retain said hinge arm means in said deployed position.

11. Self-latching hinge apparatus as set forth in claim 10 wherein said stationary bracket means includes:

a base; and a pair of upstanding parallel sidewalls integral with said base;

wherein said bearing means includes a housing mounted on said stationary bracket means; and wherein said resilient means includes:

a torsion spring fixed at its inboard end to said bearing housing and at its outboard end to said hinge arm means at a location spaced from said bearing housing.

12. Self-latching hinge apparatus as set forth in claim 10 including:

means for mounting said stationary bracket means on a mounting panel, said mounting means including adjustment means for selectively adjusting the orientation of the operating structure when said hinge arm means assumes said deployed position.

13. Self-latching hinge apparatus as set forth in claim 10 wherein said stationary bracket means includes:

a base; and a pair of upstanding parallel sidewalls integral with said base;

wherein said bearing means includes a housing mounted on said stationary bracket means; and wherein said resilient means includes:

a leaf spring fixed at its inboard end to said bearing housing and at its outboard end to said hinge arm means at a location spaced from said bearing housing.

14. Self-latching hinge apparatus as set forth in claim 10 wherein said bearing means includes:

a bearing housing attached to said bracket means;

a spherical member having a central bore therethrough rotatably mounted on said bearing housing;

a hinge pin slidably received in the central bore; and locking means for mounting said hinge arm means on said hinge means for unitary rotation therewith.

15. Self-latching hinge apparatus as set forth in claim 14 including:

damper means attached to said hinge pin for restraining motion of said hinge arm means.

16. Self-latching hinge apparatus as set forth in claim 10 wherein said hinge arm means includes:

a pair of spaced apart parallel walls;

first and second bearing means mounted in said parallel walls, respectively;

a roller having opposed ends mounted on said first and second bearings;

wherein said bearing means includes a bearing housing mounted to said bracket means; and wherein said resilient means includes a leaf spring fixed at one end to said bearing housing and engageable to said roller at locations spaced from said one end.

* * * * *